Dec. 24, 1957  W. C. VAN CLIEF, JR  2,817,108
RETAINING DEVICE FOR CHANNEL STRIPS OF SPIRALLY WOUND BRUSHES
Filed Jan. 18, 1955  2 Sheets-Sheet 1

INVENTOR
WILLIAM C. VAN CLIEF JR
ATTORNEY

Dec. 24, 1957 W. C. VAN CLIEF, JR 2,817,108
RETAINING DEVICE FOR CHANNEL STRIPS OF SPIRALLY WOUND BRUSHES
Filed Jan. 18, 1955 2 Sheets-Sheet 2

INVENTOR
WILLIAM C. VAN CLIEF JR
Oscar L. Spencer
ATTORNEY

United States Patent Office 2,817,108
Patented Dec. 24, 1957

2,817,108

RETAINING DEVICE FOR CHANNEL STRIPS OF SPIRALLY WOUND BRUSHES

William C. Van Clief, Jr., Baltimore, Md., assignor to Pittsburgh Plate Glass Company, Allegheny County, Pa., a corporation of Pennsylvania Application January 18, 1955, Serial No. 482,560

7 Claims. (Cl. 15—182)

This invention relates to a rotary brush and it has particular relation to retaining means for a channel strip containing bristles and being wound upon a mandrel to form said brush.

Rotary power driven brushes have heretofore been constructed by coiling continuous channel strips about an appropriate mandrel. Such constructions are relatively inexpensive. However, they are not always entirely satisfactory, inasmuch as there is a tendency for the channel strips to uncoil when the brushes are rapidly rotated and they may, therefore, become loosened from the core or mandrel upon which they are mounted.

There is further a certain tendency for the bristles to creep, or in some instances, the channel strip itself may tend to creep along the mandrel upon which it is wound.

In accordance with the provisions of the present invention, a power driven brush of improved resistance to centrifugal forces and other forces to which such brushes are subjected is obtained by disposition between the convolutions of a helically coiled channel strip upon a mandrel, a tape-like retaining strip having longitudinally extending teeth engaging the edges of the channel strip, said retaining strip having two ends and being coiled edgewise in a helical surface to correspond to the turns of the channel strip with both edges in the plane of the helical surface. In such construction, the teeth engaging the top of the edge of the channel strip hold the latter in place upon the mandrel even when the brush is driven at relatively high speed. Furthermore, the teeth assist in preventing any tendency of the bristles or the coiled channel strip to creep peripherally. The efficiency of the construction in this respect may be substantially increased by provision of lugs or keys on the inner circumference of the retaining strip adapted to engage in appropriate depressions or keyways in the mandrel upon which the channel strip and retaining strip are coiled.

For a better understanding of the invention, reference may be made to the accompanying drawings in which like numerals refer to like parts throughout.

Figure 1:
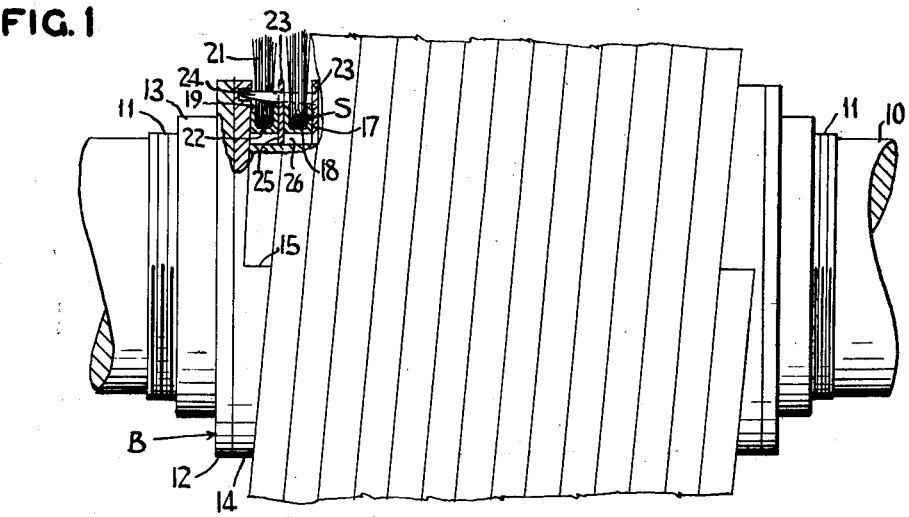
Fig. 1 is a view partly in elevation and partly in section of a brush construction embodying the present invention.

A convenient embodiment of the invention is illustrated in Fig. 1 in which the driving element of the brush is a conventional mandrel 10 having a channel brush strip S helically wound thereupon. The mandrel has threaded shoulder portions 11 upon which are threaded end, or clamping discs 12 having hubs 13. In the construction as shown, the inner face of the plate 12 is engaged against a plane face of a washer 14 which has the inner face contoured to a helical surface corresponding to the end portion of the convolutions of the channel strip S and provides a radial shoulder 15 engaging the end of the strip. If desired, the washer 14 may be keyed upon the mandrel 10 by means (not shown).

The washer 14 constitutes a refinement of the invention which may not in all instances be required. It is to be understood that one extremity of the brush may optionally be provided with such washer while the other is provided with a simple collar without the washer.

The spirally wound channel strip S of brush B comprises metallic channel 17 and a filamentary core 18 centered between the side walls 19 thereof. The core may be of wire of iron or brass or other suitable material of reasonable strength. Bristles 21 of tampico, synthetic plastic, steel wire or other material of a length replicately to double about the core 18 so that each filament in effect provides two lengths of bristle material, are packed tightly about the core and between the side walls 19. The base portion 22 of each channel is tightly seated on the mandrel 10.

Figure 6:
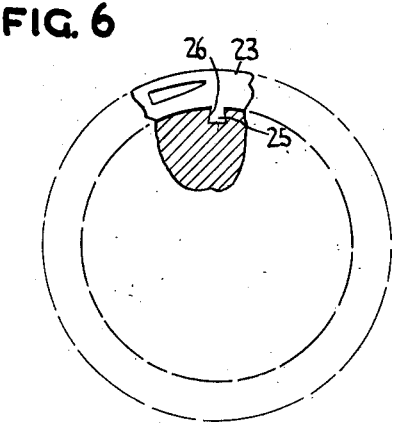
Fig. 6 is a fragmentary side view of further form of retaining strip.

Means retaining the convolutions of the channel strip in close contact with the mandrel in accordance with the provisions of the present invention comprise a spirally wound retaining strip 23 having free ends and which is disposed between the convolutions of the channel strip and has longitudinally projecting integral teeth 24, disposed approximately normally to the plane of the strip. The strip may be provided at one end, or at spaced points along its length, with a lug or lugs 25 projecting into an appropriate key way, or in a depression or series of depressions in the mandrel 10. If desired, the lug or lugs 25 may be of dovetail section as indicated in Fig. 6 adapting it to slip longitudinally in a dovetail slot in the mandrel such as the slot 26 whereby positively to lock the end of the strip to the mandrel. The strip 23 may be formed as a continuous helix in which the flat strip is disposed radially in the turns indicated in Fig. 2 extending any desired length for example from end to end of the spiral channel strip or any desired portion thereof.

Figure 4:
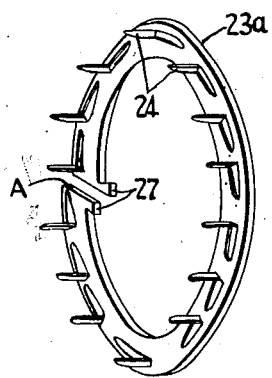
Fig. 4 is a perspective view of a modified form of retaining strip.

However, it can also be cut into sections of a length to constitute but a single turn 23a about the mandrel; such construction is illustrated in Fig. 4. If desired, tabs or lugs 27, each of which constitutes a half of a dovetail, may be formed on the ends of the spiral sections so that the sections can be slid longitudinally, thus positively locking both ends on the mandrel 10. The teeth 24 should be disposed at a radial distance from the center of the shaft or mandrel such that their lower edges will bear upon, or approximately bear upon an edge of at least one side 19 of the channel strip whereby to hold the latter down in firm engagement with respect to the mandrel.

Figure 2:
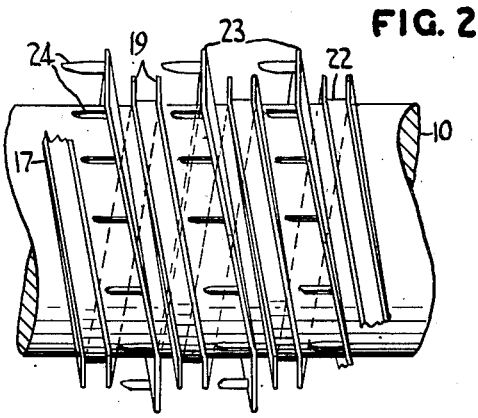
Fig. 2 is a fragmentary view showing for purposes of clarity the spiral channel strip and the retaining strip in longitudinally distended or distorted position.
Figure 7:
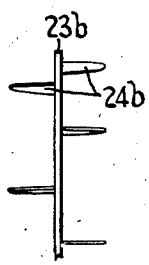
Fig. 7 is a fragmentary view of a still further form of retaining strip.

The strip as illustrated in Figs. 1 and 2 is provided with teeth projecting upon but a single side. However, as shown in Fig. 7 a strip 23b may also be formed with teeth 24b projecting alternately right and left whereby to engage both side walls of the channel strip.

Figure 5:
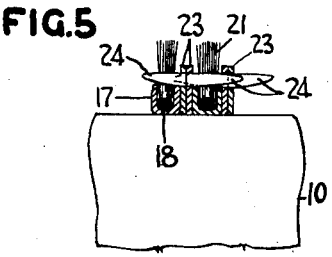
Fig. 5 is a fragmentary sectional view of an optional arrangement of retaining strips between the convolutions of a channel strip.

In Fig. 5 of the drawings is illustrated a modified arrangement of retaining strips in which two strips 23 each having teeth 24 on a single side are placed in back to back relationship with respect to each other with said teeth projecting oppositely so that each side wall of channel 17 is firmly engaged thereby. This construction is substantially stronger than that embodied by the single channel strip.

In forming retaining strips such as 23 having integral teeth such as 24, substantially any convenient technique may be employed. Probably the simplest technique where but a few units are to be employed is to stamp out annular rings having laterally projecting teeth from sheet metal in accordance with conventional practice in the formation of so-called "lock rings." These stampings may be prepared from a sheet of steel or other suitable material of appropriate gage and are recognized articles of manufacture. The rings may be split at one point of their circumference, as indicated at A in Fig. 4 to provide single turn units which may be readily inserted in position between the convolutions of a brush spirally wound of conventional channel strips. The units may be inserted between the convolutions merely by pulling the latter apart sufficiently to allow the units to be inserted and then allowing the convolutions at the point of separation to spring back into position. Any desired number of such units may be inserted in end to end relation whereby in effect to provide a substantially continuous spiral; or if preferred, the units may be inserted at spaced intervals or only at the end or ends of the brush as the requirements upon the brush for strength may dictate. As previously intimated, two such units of retaining strip may be inserted in back to back relationship with respect to each other, whereby to provide oppositely projecting teeth. If preferred, the joints upon one side may be staggered with respect to those on the other whereby to attain the effect of continuity of the spiral from one end of the brush to the other or for such lengths of the brush as may be desired.

Figure 3:
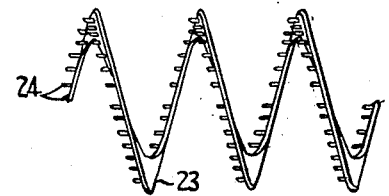
Fig. 3 is a fragmentary view likewise showing for purposes of clarity a portion of a retaining strip in longitudinally distended position.
Figure 8:
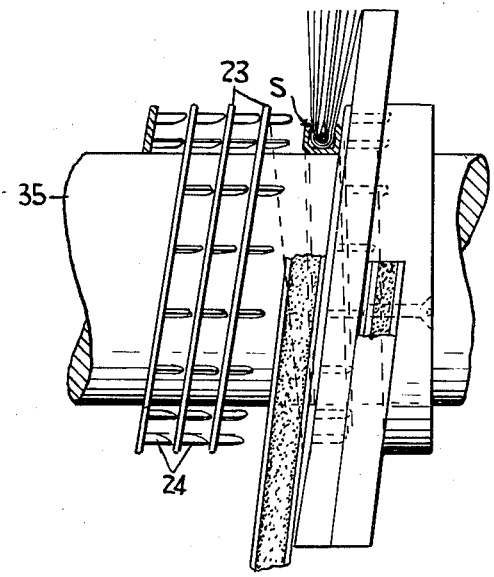
Fig. 8 is a view showing schematically the manner in which a spirally wound brush may be formed with the retaining strip between the convolutions of the channel strip.

In those instances where it is desired to provide a spiral or helical retaining strip of a length greater than one turn, for example from one end to the other of the brush, a straight strip or strap of steel of suitable gage may be spirally wound in well known manner to form a unit corresponding to that illustrated in Figs. 2, 3 and 8 of the drawings. In forming these units, the teeth may be struck out from the straight strip as a preliminary operation after which the strip is spirally wound to provide a structure such as that illustrated in longitudinally distended or distorted form in the aforementioned figures. It is also within the purview of the invention, spirally to wind the strip and then subsequently to pass it between appropriate rollers in order to strike out the teeth 24 normally to the face of the strip as shown.

For purposes of inserting the retaining strips between the convolutions or turns of the spirally wound channel strip various techniques may be employed. In those instances where the retaining strip is of but a single turn as previously intimated, the convolutions of the channel strip may be pulled apart one at a time or at such intervals as may be desired and the section of retaining strip inserted manually. In those instances where the retaining strip comprises several convolutions as a single unit, other techniques are preferable. One such technique would comprise stretching or extending the spiral channel strip for example from end to end so that the convolutions are spaced sufficiently to allow the retaining strip, when the turns of the latter have been separated to a distance corresponding to that of the turns of the channel strip, to be advanced screw-wise to the required distance. Another, and often preferable, technique comprises disposing the spirally wound retaining strip such as the strip 23 upon a mandrel of proper size and being indicated at 35 in Fig. 8. The sides of two contiguous turns or convolutions of the spiral strip preferably beginning at one end (the end toward which the teeth of the retaining strip are pointed) are parted and a portion of the channel strip (preferably near the end thereof) is inserted between the parted turns, the channel is secured to the mandrel and the latter is rotated to wind the channel strip thereabout, the turns of the retaining strip being parted progressively as the channel strip is wound upon the mandrel. It is desirable that the teeth 24 of the retaining strip be forced into position through the brush bristle material to bear upon the top edge of the adjacent wall of the channel as the latter element is wound upon the mandrel.

Figure 9:
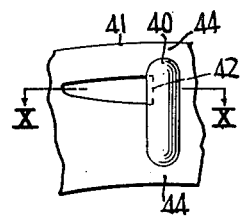
Fig. 9 is a fragmentary elevational view of a modified tooth structure for a retaining strip.
Figure 10:
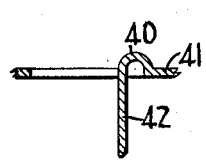
Fig. 10 is a sectional view on the line X—X of Fig. 9 of the structure shown in Fig. 9.

In Figs. 9 and 10 is illustrated a modified form of tooth structure having increased resistance to radially exerted forces acting upon its lower edge. In this embodiment, depressions 40 are formed transversely of the spirally wound retaining strip 41. The tooth 42 is so struck that it projects oppositely from the depression and the walls of the depression blend into the root of the tooth; the root thereof is at or in the depression. The curvature of the depression gives increased resistance to radially outward bending of the tooth. Furthermore the bend in the depression reduces the sharpness of the bend at the root of the tooth and thus reduces the degree of stretching of the metal at this critical point.

The depression or dented portion 40 as shown in Figs. 9 and 10, terminates short of the edges of strip 41. Thus substantial bands 44 of unbent metal are provided at each end of the depression and this reduces any tendency of the strip to stretch under tensional forces.

The inner ends of the dented portions 40 may be wedged between the spaced upper edges of the convolutions of a channel strip 45 of dovetail section.

Figure 11:
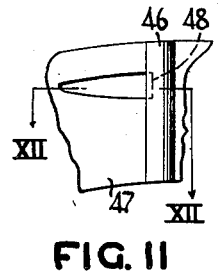
Fig. 11 is a fragmentary plan view of a further modification of tooth structure.
Figure 12:
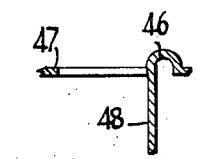
Fig. 12 is a sectional view on the line XII—XII of Fig. 11.

In the form of the invention shown in Figs. 11 and 12, the depression 46 extends completely across the strip 47. This construction is not so resistant to peripheral distention as that shown in Figs. 9 and 10, but in those instances where maximum resistance to such distention is not required, it may be employed. The construction of the tooth 48 is substantially the same as that of tooth 42. In this embodiment the depressions 46 serve to space the turns of brush channel slightly thus permitting air to circulate between turns and cooling the metal.

The forms of the invention as shown are by way of illustration. It will be apparent to those skilled in the arts that numerous modifications may be made therein without departure from the spirit of the invention or the scope of the appended claims.

I claim:

1. A retaining device for holding a retaining channel of a helically wound brush channel strip upon a mandrel to form a rotary brush, comprising a tape-like strip of metal having free ends and being coiled edgewise to generate a helical surface both edges of the strip being disposed in said surface and said strip adapted to be disposed between the turns of the channel strip and having teeth projecting vertically from said surface and being adapted to bear upon an edge of a side wall of the channel of the first mentioned strip.

2. A retaining device for holding a retaining channel of a helically wound brush channel strip upon a mandrel to form a rotary brush, comprising a tape-like strip of metal having free ends and being coiled edgewise to generate helical surface both edges of the strip being disposed in said surface and said strip adapted to be disposed between the turns of the channel strip and having integrally formed teeth projecting normal to said surface and being adapted to bear upon a top edge of a side wall of the channel strip.

3. A retaining device for holding a retaining channel of helically wound brush channel strip of a rotary brush upon a mandrel, comprising a strip of metal having free ends and being coiled to generate a helical surface and containing a plurality of turns and being adapted to be disposed between the turns of the channel strip and having integrally formed teeth projecting normal to said surface and being adapted to bear on the edge of a side wall of the channel, of said channel strip.

4. A brush comprising a strip comprising a channel helically wound in a plurality of turns about a mandrel and having bristles secured therein and a retaining element comprising a strip having free ends and being wound to generate helical surface and being disposed between the turns of the channel, said strip having teeth projecting in a direction approximately normal to said surface and bearing on the edge of the channel.

5. A brush comprising a strip comprising a channel helically wound in a plurality of turns about a mandrel and having bristles secured therein and a retaining element comprising a strip having free ends and being wound to generate a helical surface of a plurality of turns and being disposed between the turns of the channel said strip having teeth projecting approximately in a direction normal to said surface, said teeth bearing on an edge of the channel whereby to retain the channel from displacement by centrifugal force.

6. A brush comprising a strip comprising a channel helically wound in a plurality of turns about a mandrel and having radial bristles secured therein and a retaining element comprising a strip having free ends and being wound to generate a helical surface and being disposed between the turns of the channel, said strip having teeth projecting alternately right and left in a direction approximately normal to the surface, said teeth bearing on the edges of the channel.

7. A brush comprising a strip comprising a channel helically wound in a plurality of turns about a mandrel and having radial bristles secured therein and a retaining element comprising a strip having free ends and being wound to generate a single turn of a helical surface and being disposed between the turns of the channel strip at the end thereof said helical strip having teeth projecting approximately in a direction normal to the surface, said teeth bearing on the edge of the channel.

References Cited in the file of this patent
UNITED STATES PATENTS

| | | |
|---|---|---|
| 1,963,044 | Bickel | June 12, 1934 |
| 2,303,386 | Peterson | Dec. 1, 1942 |
| 2,609,559 | Peterson | Sept. 9, 1952 |